US008320239B1

(12) United States Patent
Trossen

(10) Patent No.: US 8,320,239 B1
(45) Date of Patent: Nov. 27, 2012

(54) RECEIVER-DRIVEN LAYERED MULTICAST RATE CONTROL PROTOCOL

(75) Inventor: Dirk Trossen, Arlington, MA (US)

(73) Assignee: Nokia Siemens Networks Oy, Espoo (FI)

( * ) Notice: Subject to any disclaimer, the term of this patent is extended or adjusted under 35 U.S.C. 154(b) by 2968 days.

(21) Appl. No.: 09/875,877

(22) Filed: Jun. 8, 2001

(51) Int. Cl.
*H04L 12/26* (2006.01)

(52) U.S. Cl. .................. 370/229; 370/390; 370/432

(58) Field of Classification Search .......... 370/229–235, 370/411–418, 428, 252, 467, 389–392, 432; 709/223–234
See application file for complete search history.

(56) References Cited

U.S. PATENT DOCUMENTS

| | | | | |
|---|---|---|---|---|
| 4,799,215 | A * | 1/1989 | Suzuki | 370/60 |
| 6,148,005 | A * | 11/2000 | Paul et al. | 370/469 |
| 6,157,967 | A | 12/2000 | Horst et al. | |
| 6,215,766 | B1 * | 4/2001 | Ammar | 370/229 |
| 7,093,028 | B1 * | 8/2006 | Shao et al. | 709/240 |
| 2002/0126698 | A1 * | 9/2002 | Deshpande | 370/467 |

OTHER PUBLICATIONS

Kiyohide Nakauchi, Network supported rate control mechanism for multicast streaming media, Jan. 12, 2001, IEEE, pp. 131-138.*
Saehoon Kang, The active traffic control meshanism for layered multimedia multicast in active network; Sep. 1, 2000, IEEE, pp. 325-332.*
"Receiver-driven Layered Multicast", Proceedings of ACM SIGCOMM, Aug. 1996, by Stephen McCanne, Van Jacobson and Martin Vetterli.
"Internet Group Management Protocol Version 2", Nov. 1997 by W. Fenner.
"Host Extensions for IP Multicasting", Aug. 1989, by S. Deering.
"Thin Streams: An Architecture for Multicasting Layered Video", Proceedings of 7th International Workshop on Network and Operating System Support for Digital Audio and Video (NOSSDAV), May 1997, by Linda Wu, Rosen Sharma, and Brian Smith.
"TCP-like Congestion Control for Layered Multicast Data Transfer", Proceedings of INFOCOM, Apr. 1998, by Lorlenzo Vicisano, Luigi Rizzo, and John Crowcroft.
"TEAR: TCP Emulation at Receivers—Flow Control for Multimedia Streaming", Apr. 2000, by Injong Rhee, Volkan Ozdemir, and Yung Yi.
"PLM: Fast Convergence for Cumulative Layered Multicast Transmission Schemes", Proceedings of ACM SIGMETRICS, Jun. 2000, by A. Legout and E. W. Biersack.
L. Vicisano, et al "TCP-like Congestion Control for Layered Multicast Data Transfer", Infocom '98 Seventeenth Annual Joint Conference of the IEEE Computer and Communications Societies, Proceedings, IEEE, San Francisco, CA USA Mar. 29, 1998-Apr. 1998, pp. 996-1003.

* cited by examiner

*Primary Examiner* — Steven H Nguyen
(74) *Attorney, Agent, or Firm* — Squire Sanders (US) LLP

(57) ABSTRACT

A receiver-driven layered multicast rate control protocol technique includes receiving an information flow consisting of a group of different layers and detecting traffic congestion and cessation of traffic congestion. One or more of the group of different layers are dropped upon the detection of traffic congestion and one or more of the group of different layers are added upon the detection of cessation of traffic congestion. The dropping consists of forwarding a pause message to an upstream multicast router to instruct the upstream multicast router to discard packets and the adding consists of forwarding a resume message to the upstream multicast router to instruct the upstream multicast router to transmit packets. The adding and dropping may be performed by a local receiver downstream of the multicast router and one or more of the group of different layers may be added or dropped simultaneously in a single operation.

14 Claims, 1 Drawing Sheet

RECEIVER-DRIVEN LAYERED MULTICAST RATE CONTROL PROTOCOL

BACKGROUND OF THE INVENTION

1. Field of the Invention

The present invention relates to a receiver-driven layered multicast rate control protocol and more particularly to a protocol for enabling and disabling layers utilizing IGMP (Internet Group Management Protocol) extensions.

2. Description of the Related Art

While there are evolving techniques for the provision of IP (Internet Protocol) quality of service (QoS) arrangements, there is in need for architectures to provide streaming services in the widely deployed IP best-effort networks. Rate control is a crucial element in such architectures for streaming multimedia data to resolve congested network states and to exploit spare bandwidth in the network to insure the best transmission quality. This is of particular importance when considering multicast scenarios with heterogeneous bandwidth capabilities along a transmission path from a sender to a group of receivers.

The layered encoding approach provides a transmission of different layers which are combined into a stream or flow of information. Within a local subsystem of a network, an adaptation scheme is applied to enable the transmission of appropriate layers, if the bandwidth is available, and to disable the transmission of the layers in the case of network congestion. With this approach, the available bandwidth can be adapted locally to support heterogeneous environments.

The RLM (Receiver-driven Layered Multicast) technique was originally proposed in the article entitled: Receiver-driven Layered Multicast, Proceedings of ACM SIGCOMM, August 1996, by Stephen McCanne, Van Jacobson, and Martin Vetterli. This article is incorporated by reference herein in its entirety.

As noted in the article, a transmission and rate control scheme for multicast environments is proposed using layered encoding of the information flows. That is, information, such as a video stream, is transmitted in different layers which are then combined at the receivers. Usually, there is a base layer providing a minimum quality along with extension layers which are used to improve the quality of the received stream.

For an implementation of the RLM scheme, IGMP (Internet Group Management Protocol) may be used. IGMP is a recommended standard of the IETF (Internet Engineering Task Force) and is defined in RFC 2236, entitled: Internet Group Management Protocol Version 2, November 1997 by W. Fenner. This standard is incorporated by reference herein in its entirety. Furthermore, related standard RFC 1112, entitled: Host Extensions for IP Multicasting, August 1989, by S. Deering, specifies the extensions required of a host implementation of the IP needed to support multicasting and this related standard is also incorporated by reference herein in its entirety.

As noted in this standard, a layer is disabled in the case of congestion by leaving the appropriate multicast group and a layer is added by joining the group locally. For that, the appropriate IGMP operations are invoked (join/leave) at the local upstream multicast router. However, the use of IGMP operations for the enable/disable operations add significant delay and complexity. For example, when leaving the group, the upstream multicast router sends a query to the local group to determine whether there are other group members left. The router waits for a defined time interval until the transmission and this multicast group is stopped. Furthermore, when joining the group, the transmission can be immediately continued only if the multicast spanning tree is still valid. If not, the entire spanning tree build operation of the appropriate routing protocol must be issued again which adds a significant delay and a large overhead to the system due to the number of operations which must be performed.

These IGMP-specific latencies are known as join/leave latencies and restrict the usage of the protocol due to its poor responsiveness. Furthermore, the RLM protocol and its derivatives use specific rate adjustment procedures to apply in the IGMP join/leave operations.

The following references, noted below, disclose the use of the specific rate adjustment procedures noted above and are all incorporated by reference herein in their entirety:

The article entitled: Thin Streams: An Architecture for Multicasting Layered Video, Proceedings of 7th International Workshop on Network and Operating System Support for Digital Audio and Video (NOSSDAV), May 1997, by Linda Wu, Rosen Sharma, and Brian Smith.

The article entitled: TCP-like Congestion Control for Layered Multicast Data Transfer, Proceedings of INFOCOM, April 1998, by Lorenzo Vicisano, Luigi Rizzo, and Jon Crowcroft.

The article entitled: TEAR: TCP Emulation at Receivers—Flow Control for Multimedia Streaming, April 2000, by Injong Rhee, Volkan Ozdemir, and Yung Yi.

The article entitled: PLM: Fast Convergence for Cumulative Layered Multicast Transmission Schemes, Proceedings of ACM SIGMETRICS, June 2000, by A. Legout and E. W. Biersack.

SUMMARY OF THE INVENTION

An object of the invention is to provide a receiver-driven layered multicast rate control protocol technique which includes receiving an information flow consisting of a plurality of different layers and detecting traffic congestion and cessation of traffic congestion. One or more of the group of different layers are dropped upon detection of traffic congestion and one or more of the group of different layers are added upon detection of cessation of traffic congestion. The dropping consists of forwarding a "pause" message to an upstream multicast router to instruct the upstream multicast router to discard packets and the adding consists of forwarding a "resume" message to the upstream multicast router to instruct the upstream multicast router to transmit packets.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
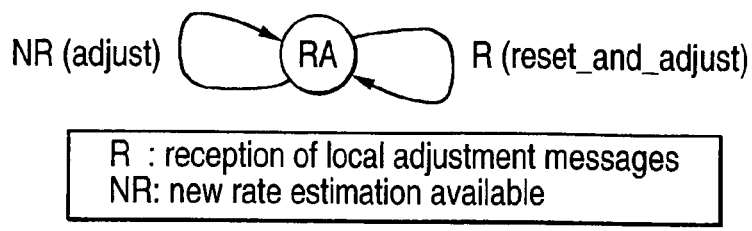
FIG. 1 is a receiver state transition diagram which illustrates the state transitions in a receiver operating in accordance with an embodiment of the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. In addition, well-known elements have been omitted from the drawing figures for simplicity of illustration and discussion and so as not to obscure the invention. Still furthermore, arrangements may be shown in simplified block diagram form to avoid obscuring the invention and also view of the fact that specifics with respect to such block diagram arrangements are highly dependent upon the platform within which the present invention is to be implemented. That is, such specifics should be well within the purview of one skilled in the art. Where specific details are set forth in order to describe example embodiments of the invention, it should be apparent to one skilled in the art that the invention can be practiced without or with variations of the specific details. Lastly, it should be apparent that differing combinations of hard-wired circuitry and software instructions can be used to implement embodiments of the present invention. That is, the present invention is not limited to any specific combination of hardware and software.

In the protocol of the present invention, rate adjustment mechanisms are effected in each receiver and the bandwidth on the reverse path back to the bottleneck is immediately adapted appropriately in accordance with the outcome of the adjustment process.

In contrast to the RLM schemes described in the articles cited above, the adjustment is not limited to adding or dropping exactly one layer to avoid bad convergence effects. Rather, the rate adjustment is realized by immediately enabling or disabling as many layers is as necessary to achieve the desired rate. This usually results in enabling or disabling several layers in one adjustment operation.

The assumption has been made that for this kind of adjustment, each layer is transmitted at a nearly constant rate. This can be realized by using variable encoding, thereby ensuring CBR (Constant Bit Rate)-like traffic, or by appropriately smoothing the traffic at the sender. Furthermore, it has been assumed that each receiver is aware of the distribution of the bandwidth among the different layers. This can be effected by means of SDP (Session Description Protocol) or SAP (Session Announcement Protocol) as respectively discussed in the standard RFC 2327, entitled: SDP: Session Description Protocol, April 1998, by M. Handley and V. Jacobson and in the standard RFC 2974, entitled: Session Announcement Protocol, October 2000, by M. Handley, C. Perkins, and E. Whelan. These standards are incorporated by reference herein in their entirety.

FIG. 1 is a receiver state transition diagram which illustrates the state transitions in a receiver operating in accordance with an embodiment of the present invention. FIG. 1 illustrates the protocol used by a very simple state machine to be implemented in each receiver. It consists of only one state RA running any kind of rate adjustment process, for example, a window or timer based rate adjustment process. In FIG. 1, R corresponds to the reception of local adjustment messages while NR corresponds to a new rate estimation available.

The state noted above usually represents a more complex machine implementing a specific rate adaptation algorithm. If a new rate estimation is available, and adjustment procedure is started by enabling or disabling one or more layers to reach the desired rate. The realization of the adjustment procedure usually depends on the rate adaptation process used. The resulting adjustment messages are only sent out to the local subnet and the messages are forwarded by the upstream multicast router.

If there is a reception of local adjustment messages, the local rate adjustment process is reset to avoid overlapping adjustment experiments on the same link. The details with regard to the reset operation have been omitted since they depend on the realization of the adaptation process used. It is apparent that the protocol in accordance with the present invention is to be used as a framework for a receiver-driven layered multicast rate control arrangement which is independent of the specific rate adjustment algorithm being used.

For the realization of fast enable/disable operations in the protocol in accordance with the present invention, an extension to the IGMP is proposed which realizes a simple switch within the upstream router, the switch enabling the transmission if it is on and discarding the packets if it is off.

The required extension adds to messages to the current IGMP protocol. Namely, an IGMP_PAUSE message and an IGMP_RESUME message are added. These messages are used to command the upstream multicast router to either pause or resume the forwarding process by changing the internal router state for this multicast group.

Figure 2:
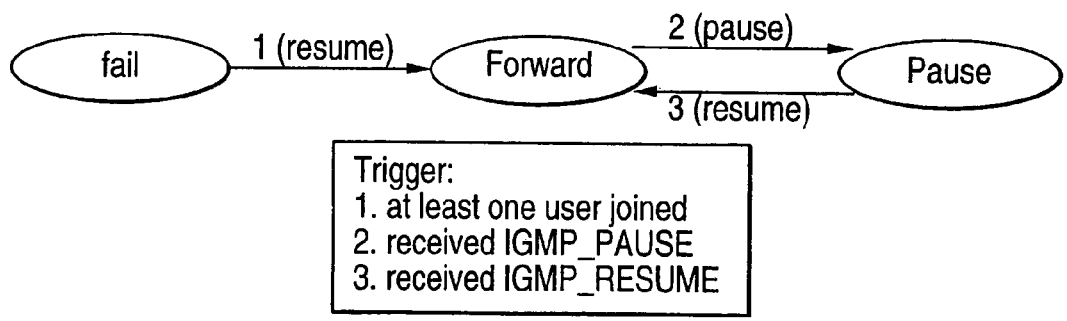
FIG. 2 is a router state transition diagram which illustrates the state transitions in a router state machine.

FIG. 2 is a router state transition diagram for a router state machine. There are three different states to be realized for each multicast group. In the FORWARD state, the transmission for the specific group is enabled while the transmission is disabled, that is, halted, in the PAUSE state.

Figure 3:
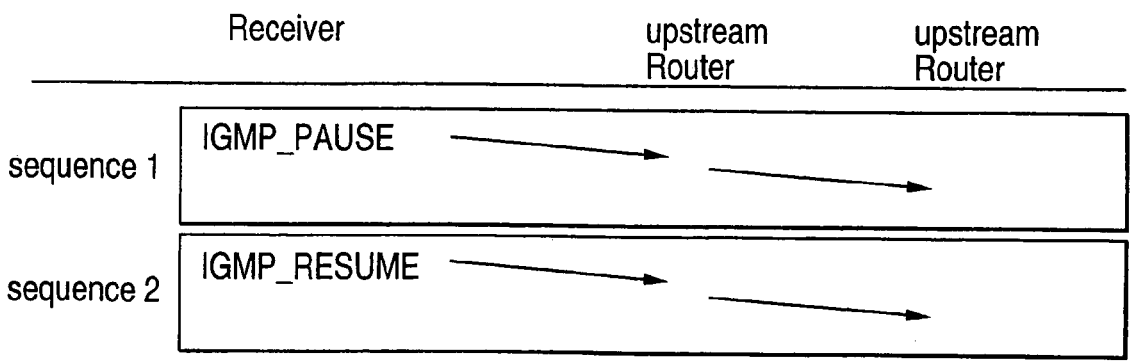
FIG. 3 is a message sequence chart which illustrates how additional IGMP messages are routed.

FIG. 3 is a message sequence chart which shows how the additional IGMP messages are routed within the system. The first sequence represents the messages when being in the FORWARD state at the upstream router while the second message sequence is valid when being in the PAUSE state at the upstream router.

After at least one user has joined the appropriate multicast group, the router enters the FORWARD state and starts transmission for this group at shown by trigger 1 of FIG. 2.

The IGMP_PAUSE messages are usually sent by any local receiver to the upstream, that is, local, multicast router to pause the forwarding process as shown by sequence 1 of FIG. 3. When receiving an IGMP_PAUSE message in the FORWARD state at shown by trigger 2 of FIG. 2, this router enters the PAUSE state and the message is directly forwarded to the upstream router if there is no interest in any other local downstream link to pause the appropriate forwarding process in this router as shown by sequence 1 of FIG. 3. Thus, the disabling functionality is essentially a write through functionality.

The forwarding sequence of IGMP_PAUSE messages finally ends in the last multicast router on the route between the sender and receiver and the forwarding latency corresponds to the sum of the link and local forwarding latencies up to the bottleneck router, resulting in a minimal response time for the adjustment.

If there is an incoming IGMP_RESUME message at a multicast router in a PAUSE state (as initially sent by any local receiver at shown by sequence 2 of FIG. 3), the local forwarding process is immediately resumed by entering the FORWARD state as shown by trigger 3 of FIG. 2. Furthermore, the upstream router is notified immediately by sending an IGMP_RESUME message at shown by sequence 2 of FIG.

3 to also resume the upstream forwarding process. This forwarding sequence finally ends in the last multicast router on the route between the sender and receiver. Thus, the response time latency for this bandwidth increase is bounded by the sum of the link and forwarding latencies from the initiating receiver up to the router providing the requested layer.

The additional IGMP_PAUSE and IGMP_RESUME messages can easily be integrated into the IGMP standard by merely defining to additional message types, for example, 0x18 and 0x19 in compliance with the previously cited RFC 2236 standard.

Thus, the present invention improves responsiveness and reduces the complexity as compared to earlier schemes. Using the proposed IGMP extensions for receiver-driven layered multicast rate control allows the adjustment of the bandwidth locally without unnecessary IGMP timeout delays. Hence, the rate is adjusted from the receiver of to the appropriate router with a delay which is approximately equal to the sum of the link latencies from the receiver up to the router and thus, the response latency is minimized.

The large delays in the earlier schemes are caused by different timers within IGMP when leaving a multicast group locally. The local multicast router sends an IGMP query message to obtain at least one remaining member after receiving a leave operation by a local member. If there is no local member left, the group is released and the message forwarding stopped. For this query operation, a large delay, on the order of seconds, is used which directly influences the responsiveness of the system, since the congestion is not stopped until the timer has expired.

Thus, the earlier schemes encounter a specific response delay, known as the join/leave latency, which is avoided by the protocol in accordance with the present invention. That is, the earlier schemes use join/leave messages to stop or restart transmission of layers. As a consequence thereof, the entire multicast group is released in the case of congestion, thereby requiring the group to be reestablished at the local router when the bandwidth is again available. This results in large delays leading to poor responsiveness as well as a large overhead.

Furthermore, complex spanning tree operations at the local routers are not necessary due to the avoidance of IGMP join/leave operations in the protocol in accordance with the present invention. That is, routing table and spanning tree updates are not necessary.

Lastly, the generic character of the protocol in accordance with the present invention allows the use of any kind of rate adjustment mechanism, such as probing or estimation based rate adjustment mechanisms.

This concludes the description of the example embodiment. Although the present invention has been described with reference to the illustrative embodiment, it should be understood that numerous other modifications and embodiments can be devised by those skilled in the art that fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A receiver-driven layered multicast rate control protocol method comprising:
   receiving at an end-user receiver an information flow comprising a plurality of different layers;
   detecting traffic congestion and cessation of traffic congestion; and
   dropping one or more of said plurality of different layers upon detection of traffic congestion and adding one or more of said plurality of different layers upon detection of cessation of traffic congestion,
   said dropping comprising forwarding a pause message from said end-user receiver to an upstream multicast router to instruct said upstream multicast router to discard packets, and said adding comprising forwarding a resume message from said end-user receiver to said upstream multicast router to instruct said upstream multicast router to transmit packets, said end-user receiver thereby providing rate adjustment to implement the receiver-driven layered multicast rate control protocol.

2. The method of claim 1, said dropping further comprising forwarding the pause message from said upstream multicast router to at least another upstream multicast router which is upstream from said upstream multicast router to instruct said at least another multicast router to discard packets and said adding further comprising forwarding the resume message from said upstream multicast router to said at least another multicast router to instruct said at least another upstream multicast router to transmit packets.

3. The method of claim 2, wherein said adding and dropping is performed by a local receiver downstream of said upstream multicast router.

4. The method of claim 1, wherein said one or more of said plurality of different layers are added or dropped simultaneously in a single operation.

5. The method of claim 2, wherein said one or more of said plurality of different layers are added or dropped simultaneously in a single operation.

6. The method of claim 3, wherein said one or more of said plurality of different layers are added or dropped simultaneously in a single operation.

7. A receiver-driven layered multicast rate control protocol system comprising:
   an end-user receiver to receive an information flow comprising a plurality of different layers;
   a detector to detect traffic congestion and cessation of traffic congestion;
   wherein one or more of said plurality of different layers are dropped by said receiver upon detection of traffic congestion by said detector and one or more of said plurality of different layers are added by said end-user receiver upon detection of cessation of traffic congestion by said detector,
   said dropping comprising forwarding a pause message from said end-user receiver to an upstream multicast router to instruct said upstream multicast router to discard packets and said adding comprising forwarding a resume message from said receiver to said upstream multicast router to instruct said upstream multicast router to transmit packets, said receiver thereby providing rate adjustment to implement the receiver-driven layered multicast rate control protocol.

8. The system of claim 7, wherein said dropping by said end-user receiver further comprises forwarding the pause message from said upstream multicast router to at least another upstream multicast router which is upstream from said upstream multicast router to instruct said at least another multicast router to discard packets and wherein said adding by said end-user receiver further comprises forwarding the resume message from said upstream multicast router to said at least another multicast router to instruct said at least another upstream multicast router to transmit packets.

9. The system of claim 7, wherein said one or more of said plurality of different layers are added or dropped by said receiver simultaneously in a single operation.

10. The system of claim 8, wherein said one or more of said plurality of different layers are added or dropped by said receiver simultaneously in a single operation.

11. A program storage device readable by a machine, tangibly embodying a program of instructions executable by the machine to perform a receiver-driven layered multicast rate control protocol method, the method comprising:
   receiving at an end-user receiver an information flow comprising a plurality of different layers;
   detecting traffic congestion and cessation of traffic congestion; and
   dropping one or more of said plurality of different layers upon detection of traffic congestion and adding one or more of said plurality of different layers upon detection of cessation of traffic congestion, said dropping comprising forwarding a pause message from the end-user receiver to an upstream multicast router to instruct said upstream multicast router to discard packets and said adding comprising forwarding a resume message from said end-user receiver to said upstream multicast router to instruct said upstream multicast router to transmit packets, said receiver thereby providing rate adjustment to implement the receiver-driven layered multicast rate control protocol.

12. The device of claim 11, said dropping further comprising forwarding the pause message from said upstream multicast router to at least another upstream multicast router which is upstream from said upstream multicast router to instruct said at least another multicast router to discard packets and said adding further comprising forwarding the resume message from said upstream multicast router to said at least another multicast router to instruct said at least another upstream multicast router to transmit packets.

13. The device of claim 11, wherein said one or more of said plurality of different layers are added or dropped simultaneously in a single operation.

14. The device of claim 12, wherein said one or more of said plurality of different layers are added or dropped simultaneously in a single operation.

* * * * *